US006978609B2

(12) United States Patent
Busch

(10) Patent No.: US 6,978,609 B2
(45) Date of Patent: Dec. 27, 2005

(54) ELECTROHYDRAULIC SERVO DOOR DRIVE FOR OPERATING A DOOR, A WINDOW, ETC.

(75) Inventor: Svan Busch, Dortmund (DE)

(73) Assignee: Dorma GmbH + Co. KG, Ennepetal (DE)

( * ) Notice: Subject to any disclaimer, the term of this patent is extended or adjusted under 35 U.S.C. 154(b) by 41 days.

(21) Appl. No.: 10/736,806

(22) Filed: Dec. 16, 2003

(65) Prior Publication Data

US 2004/0182234 A1 Sep. 23, 2004

(30) Foreign Application Priority Data

Dec. 20, 2002 (DE) ................................ 102 61 225

(51) Int. Cl.[7] .......................... F16D 31/02; G05D 7/00
(52) U.S. Cl. ............................ 60/460; 60/466; 91/442
(58) Field of Search .......................... 91/433, 442, 446, 91/452; 60/431, 432, 460, 466, 468; 137/102

(56) References Cited

U.S. PATENT DOCUMENTS 3,060,688 A * 10/1962 Gondek ....................... 91/433
3,699,993 A * 10/1972 Herion et al. ............... 137/102
4,143,310 A * 3/1979 Fujinawa et al. ........... 318/571
4,367,087 A * 1/1983 Cardenas Franco et al. .. 65/163
4,813,655 A * 3/1989 Hennells .................. 267/64.28
5,048,644 A * 9/1991 Pelto-Huikko ............... 60/466
5,259,293 A * 11/1993 Brunner ........................ 60/468
5,355,773 A * 10/1994 Winkels ...................... 91/452
5,373,121 A * 12/1994 Nagel .......................... 187/275
5,526,673 A * 6/1996 Avitan ........................ 73/1.81
5,687,451 A 11/1997 Singer
5,816,132 A * 10/1998 Langner et al. ............... 91/446
5,996,466 A * 12/1999 Heusser ........................ 91/420
6,098,647 A * 8/2000 Haussler et al. ............ 137/102
6,175,204 B1 * 1/2001 Calamatas .................. 318/375
6,198,241 B1 * 3/2001 Calamatas .................. 318/434
6,329,771 B1 * 12/2001 Choi et al. ..................... 318/66
6,843,340 B2 * 1/2005 Miller ........................ 180/308

* cited by examiner

*Primary Examiner*—Edward K. Look
*Assistant Examiner*—Michael Leslie
(74) *Attorney, Agent, or Firm*—Cohen, Pontani, Lieberman & Pavane

(57) ABSTRACT

The invention pertains to an electrohydraulic servo door drive for operating a door, a window, or the like, with a hold-open function, where a valve is installed in the hydraulic circuit to implement the hold-open function. To create an electrohydraulic servo door drive which requires less space and can be produced at lower cost, it is provided according to the invention that the valve is designed as a hydraulically controlled hold-open valve.

21 Claims, 7 Drawing Sheets

ELECTROHYDRAULIC SERVO DOOR DRIVE FOR OPERATING A DOOR, A WINDOW, ETC.

BACKGROUND OF THE INVENTION

1. Field of the Invention

The invention pertains to an electrohydraulic servo door drive for operating a door, a window, etc., with a hold-open function, where a valve is installed in the hydraulic circuit to implement the hold-open function.

2. Description of the Related Art

A servo door drive of this type is well known. The hold-open function of the servo door drive is usually achieved by means of a solenoid valve, which prevents hydraulic fluid from escaping from the piston space of the servo door drive. The disadvantages of this type of design are the amount of space required for it and the additional cost.

SUMMARY OF THE INVENTION

The task of the present invention is therefore to create an electrohydraulic servo door drive which requires less space and which can be produced at lower cost.

According to the invention, the valve is designed as a hydraulically controlled hold-open valve; as a result, costs can be reduced because a hold-open valve is less expensive than the previously used solenoid valve. Solenoid valves must be purchased additionally, whereas hydraulically controlled hold-open valves can be self-fabricated. In addition, the advantage of improved fire safety is also present, because, if there should be a power failure, the valve according to the invention automatically closes the door connected to the inventive servo door drive. No failure is possible in a case such as this, and the efficiency of the door drive is not affected. The design according to the invention also provides for the integration of overload protection into the servo door drive as well as a closing sequence control function for doors with two wings. The hydraulically controlled hold-open function makes it possible for the door to be kept open continuously, because only a low control pressure is required. A motor-pump unit, for example, can maintain such a low pressure over a very long time without the danger of overheating and with minimal burning of the brushes. In addition, the design according to the invention also provides the advantage that, after the motor has been turned off, the inventive servo door drive continues to operate without being affected by the hydraulic drive, which means that there is no need for an additional switching valve.

A hold-open valve according to the invention consists preferably of a 2/2-way directional control valve. This 2/2-way control valve prevents hydraulic fluid from returning from the piston space to the tank space. The 2/2-way directional control valve is designed so that a relatively low control pressure is able to maintain a pressure many times greater in the piston space of the servo door drive. As a result, the door can be kept open continuously against the elastic force of the servo door drive, the motor being subjected to only a very small load during this time.

According to an advantageous elaboration, the hold-open valve has a control piston and a nonreturn valve. The control piston is controlled by a pump pressure lower than the delivery pressure, which means that the control surface is larger than the sealing surface of the 2/2-way directional control valve. Because the nonreturn valve separates the piston space and the pump hydraulically from each other, hydraulic fluid is prevented from leaving the piston space via the nonreturn valve. This is necessary so that the pump pressure can be used to control the 2/2-way directional control valve. That is, when the delivery pressure of the pump is lower than the pressure in the piston space, the two areas are separated from each other, which means that the pump can control the 2/2-way directional control valve.

The pressure in the piston space of the servo door drive is preferably several times greater than the control pressure in the hold-open valve. In this way, a door provided with the servo door drive according to the invention can be kept open continuously against the elastic force of a spring installed in the rotating wing drive.

A motor, preferably in the form of a DC motor, an electronically commutated motor, or a speed-controlled AC or 3-phase motor, is provided in the hydraulic circuit to operate the pump, because only these types of motors allow the torque and the rotational speed to be adjusted and also allow a continuous power-on function to be realized with low power losses.

The forward flow and the return flow in the hydraulic circuit are preferably separated from each other. This reduces the number of valves required but does require an additional hydraulic line.

A nonreturn valve is preferably integrated into the control piston of the hold-open valve. According to an alternative embodiment, the nonreturn valve can also be installed in a bypass around the hold-open valve.

According to an advantageous elaboration, throttle valves are provided in the hydraulic circuit to damp the opening and/or closing movement.

The hold-open valve according to the invention is preferably controlled via the pressure of the pump.

According to a preferred elaboration, the electrohydraulic servo door drive according to the invention is equipped with an auxiliary device for performing a support function during the actuation of the door, the window, etc. This makes possible the integration of additional basic functions into the door drive. Thus, for example, the support of the drive allows the user to open the door with only a small amount of force. The door is not actually opened automatically, however. By exerting a sufficient amount of torque, the user can close the door again in accordance with fire safety regulations without the assistance of the motor. A hold-open function or closing-delay function can also be integrated into the inventive servo door drive. An end-stop damping function can also be provided to prevent the door from slamming.

To integrate these additional basic functions, the auxiliary device advantageously has a motor amplifier connected to the motor, especially an amplifier which operates according to the PWM (pulse-width modulation) principle.

The motor amplifier is also connected to a controller and current regulator.

In addition, the motor amplifier and the controller and current regulator, for example, of the electrohydraulic servo door drive are each connected to a voltage supply.

Because knowledge of the position of the pinion and thus also of the position of the drive shaft is required for the control of the servo door drive, the controller and current regulator is connected in an advantageous elaboration of the invention to a position sensor, which cooperates with the pinion.

So that the signals transmitted by the position sensor can be processed in the controller and current regulator, the controller and current regulator is preferably provided with a D/A converter.

FIG. 1 shows a first embodiment of the servo door drive according to the invention;

FIG. 2 shows a second embodiment of the servo door drive according to the invention;

FIG. 3 shows a first embodiment of a hold-open valve used in the servo door drive according to the invention;

FIG. 4 shows a second embodiment of the hold-open valve according to FIG. 3;

FIG. 5 shows a third embodiment of the hold-open valve according to FIG. 3;

FIG. 6 shows a fourth embodiment of the hold-open valve according to FIG. 3;

FIG. 7 shows a fifth embodiment of the hold-open valve according to FIG. 3 with an additional bypass valve;

FIG. 8 shows a sixth embodiment of the hold-open valve according to FIG. 3 with an additional bypass valve;

FIG. 9 shows a diagram which illustrates the door drive shaft angle as a function of the elastic force, the pump pressure, the motor torque, and the motor current; and FIG. 10 shows a diagram which illustrates the motor torque as a function of the motor rpm's and the motor current.

BRIEF DESCRIPTION OF THE DRAWINGS

The nonreturn valve 15 and the relief valve 12 are installed in the sealing disk 10. The relief valve 12 is spring-loaded. In addition, the valves 12 and 15 are installed in anti-parallel fashion. The same number and type of valves 13 and 16 are also present in the sealing disk 11, so that excess pressure can escape from the spring space into the piston 2.

Figure 1:
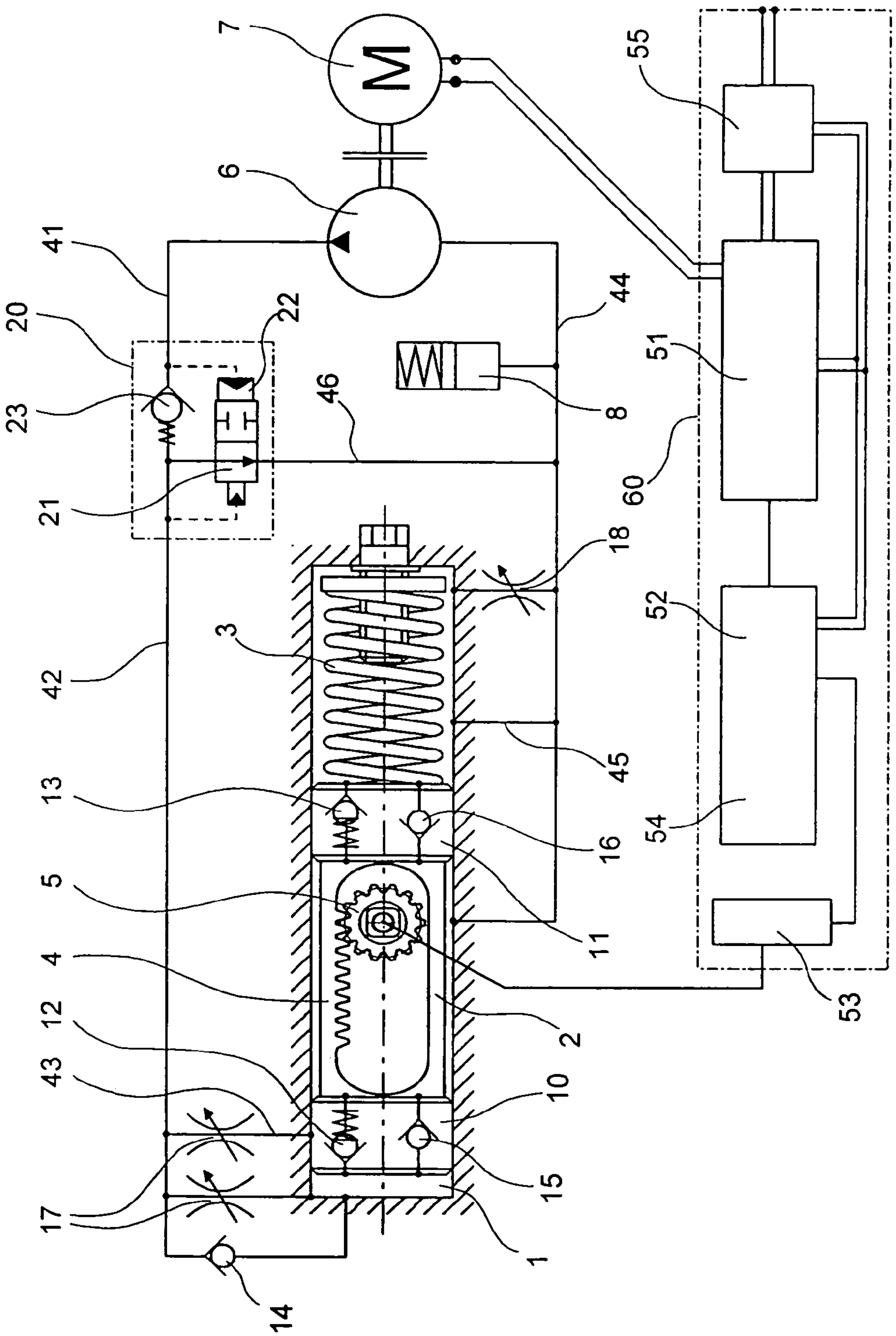
FIG. 1 shows an inventive servo door drive according to a first embodiment. In this embodiment, the closing movement of the rotating door leaf drive is controlled via throttle valves.

The servo door drive has a piston space 1, in which a piston 2 can travel against the force of a spring 3. The piston 2 is provided with a set of teeth 4, which meshes with a pinion 5. The pinion cooperates in turn with a closing mechanism (not shown) for a door, a window, or the like. In the exemplary embodiment shown here, the set of teeth 4 is provided inside the piston 2. When the piston 2 moves, the set of teeth 4 moving along with it thus causes the pinion 5 to rotate.

The piston 2 is provided at both ends with sealing disks 10, 11, which rest with a sealing action against the inside wall of the piston space 1. To avoid destructive excess pressures, relief valves 12, 13 are introduced into the sealing disks 10, 11. The relief valve 13 is necessary only when a throttle valve 18 has also been installed for the hydraulic damping of the opening movement, because otherwise it would be impossible for any critical excess pressures to develop in this area of the piston space 1. A nonreturn valve 15, which makes it possible for the door to be opened manually even after the drive has been shut off, is also provided in the sealing disk 10. A nonreturn valve 14 allows the hydraulic fluid to bypass the throttle valves 17 and to arrive in the piston space 1 with minimal losses when the door is opened automatically. FIG. 1 shows the details of how the valves 12–18 are installed.

The nonreturn valve 15 and the relief valve 12 are installed in the sealing disk 10. The relief valve 12 is spring-loaded. In addition, the valves 12 and 15 are installed in anti-parallel fashion. The same number and type of valves 13–16 are also present in the sealing disk 11, except that these valves are installed in the same direction, so that excess pressure can escape from the spring space into the piston 2.

The piston 2 is operated by way of a hydraulic circuit, which is connected by hydraulic lines to the piston space 1. A pump 6, which is driven by a motor 7, is installed in the hydraulic circuit. The motor 7 is preferably designed as a DC motor or as a speed-controlled AC or 3-phase motor, because the motor torque and speed can be easily varied with these types of motors, and a continuous power-on function can be realized with minimal power loss.

A hydraulically controlled hold-open valve 20 is also provided in the hydraulic circuit. This valve consists of three components:

a 2/2-way directional control valve 21, which prevents hydraulic fluid from returning from the piston space to a tank space 8 installed in the hydraulic circuit;

a control piston 22, which serves to control the 2/2-way directional control valve by means of a pump pressure which is lower than the delivery pressure of the pump 6; and a nonreturn valve 23, which has the effect of producing a hydraulic separation between the piston space 1 and the pump 6.

The 2/2-way directional control valve is designed so that a relatively low control pressure on the control piston 22 is able to maintain a pressure many times larger in the piston space 1 of the rotating wing door drive and so that hydraulic fluid cannot flow back into the tank space 8. As a result, the door or window or the like can be kept open continuously, even though only minimal load is put on the motor 7. When the delivery pressure of the pump 6 is lower than the pressure in the piston space 1, therefore, the two areas are hydraulically separated from each other, and as a result the pump 6, acting by way of the control piston 22, is able to control the 2/2-way directional control valve.

So that the 2/2-way directional control valve always assumes a clearly defined position, i.e., so that the valve never assumes a "floating" position in which neither the nonreturn valve 23 nor the 2/2-way directional control valve is completely closed, either the nonreturn valve 23 or the 2/2-way directional control valve or both should be spring-loaded by a weak elastic force exerted by at least one spring element 26 or 27.

Throttle valves 17, 18 are also provided in the hydraulic circuit; these valves serve to control the opening and closing movement. FIG. 1 shows the exact details of how they are installed. FIG. 1 also shows exactly how the hydraulic lines 41–46 of the hydraulic circuit are laid out and connected. The hydraulic lines 43–45 are controlled via the piston 2.

The tank space 8 is formed by, for example, a hydraulic compensation reservoir, which keeps an approximately constant, low pressure on the suction side of the pump 6 even when the volume of the hydraulic fluid changes slightly, as can happen as a result of the effects of changes in temperature, among other causes, so that a shaft sealing ring of the pump is permanently relieved of load. This compensation reservoir can be formed by, for example, a gas "bladder", a bladder accumulator with an elastic membrane or balloon, a piston-type accumulator with or without a spring, or some other, similar type of device.

Figure 2:
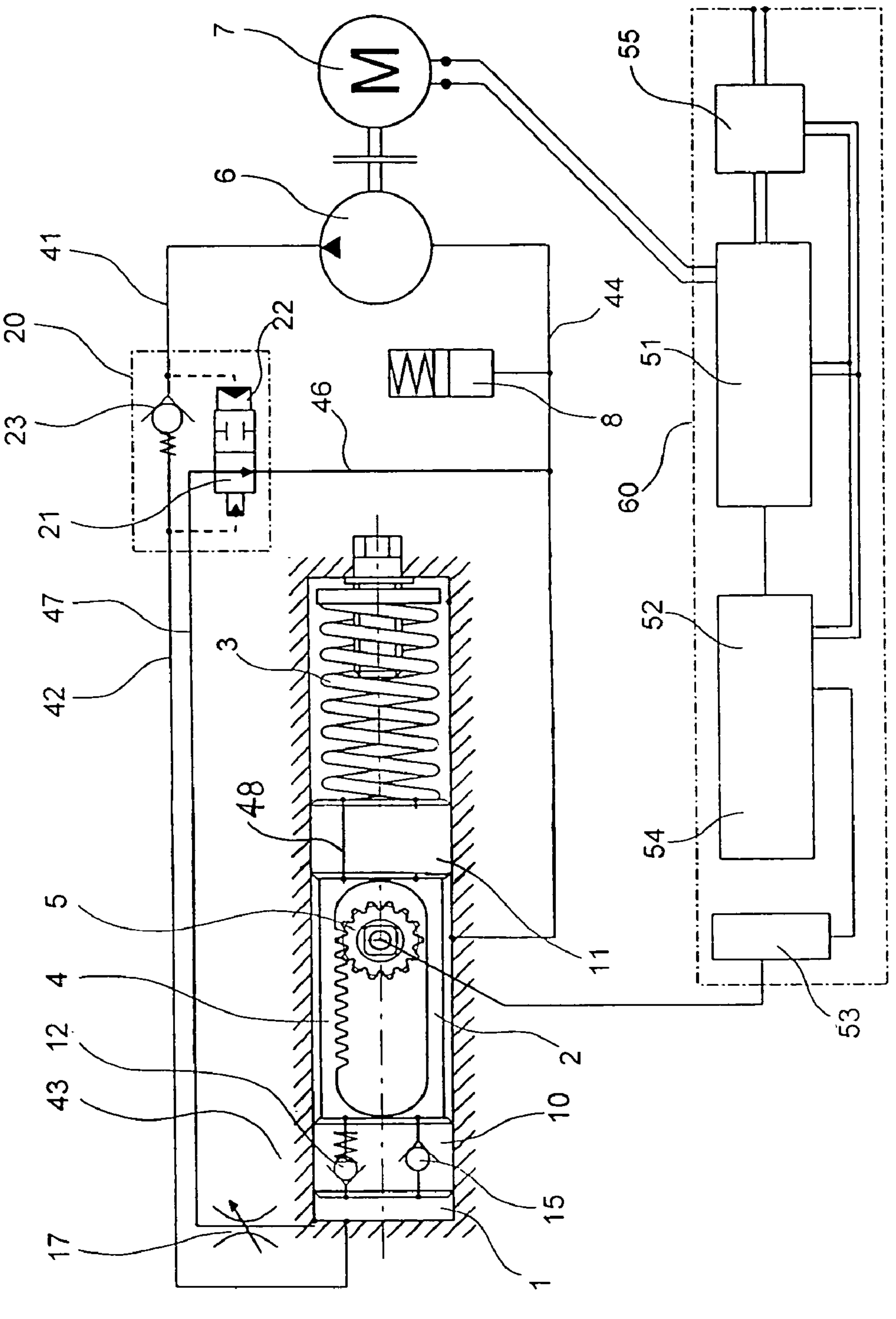

FIG. 2 shows a second embodiment of the rotating door leaf drive according to the invention. This embodiment differs from that shown in FIG. 1 in that here the forward flow is separated from the return flow. This offers the advantage that the nonreturn valve 14 of FIG. 1 is no longer needed, even though functionally there is no change; an additional hydraulic line 47, however, is required. Because the drive shown in FIG. 2 does not provide for the hydraulic damping of the door-opening phase, the relief valve 13 of FIG. 1 can also be eliminated and replaced by a connecting line 48. FIG. 2 shows how all the hydraulic lines are laid out and how the various valves must be installed.

There is no longer a nonreturn valve in the sealing disk 11; instead, there is a direct connection 48 from the piston space 1 to the interior of the piston 2. The nonreturn valve 15 and the relief valve 12 in the sealing disk 10 are again connected in anti-parallel fashion.

Figure 3:
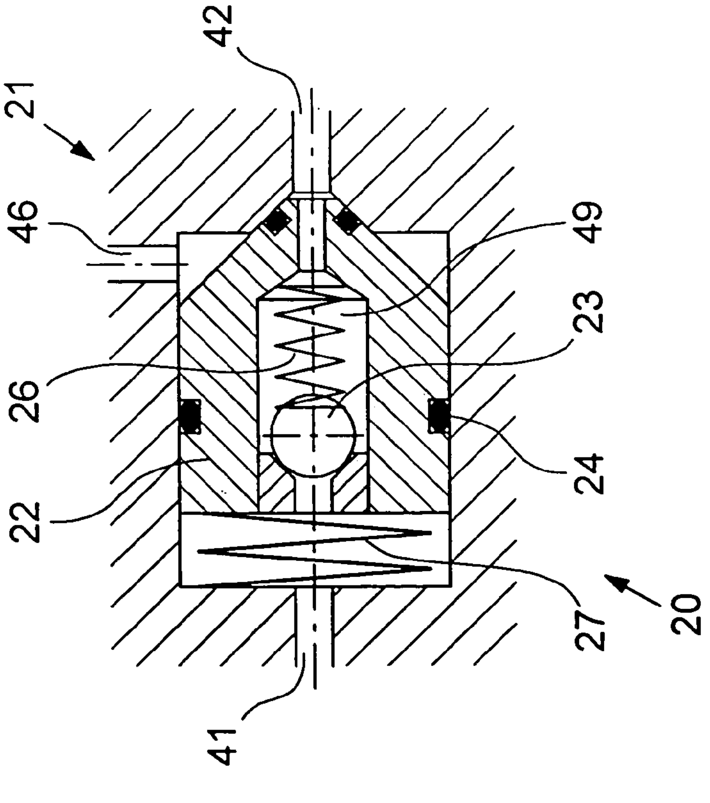

FIG. 3 shows a first embodiment of the hold-open valve 20. The 2/2-way directional control valve 21 is connected on the left side of FIG. 3 by the hydraulic line 41 to the pump 6 and on the right side of FIG. 3 by the hydraulic line 42 to the piston space 1. An upward-directed hydraulic line 46 leads to the tank space 8. The control piston 22 is provided with a through-hole 49, which consists of two areas with different diameters. On the side leading to the piston space 1, the diameter of the through-hole 49 is smaller than on the side leading to the pump 6. In the larger area of the through-hole 49, the nonreturn valve 23 is installed, which is integrated into the control piston 22.

In addition, the spring element 27, which pushes the control piston 22 toward the right in FIG. 3, i.e., toward the connection of the hydraulic line 42 with the piston space 1, and which thus, when in this position, closes off the hydraulic line 42 leading to the hydraulic line 46, is installed between the control piston 22 and the side (hydraulic line 41) leading to the pump 6. At a certain pressure, the nonreturn valve 23 opens, and hydraulic medium can flow from the hydraulic line 41 via the through-hole 49 into the hydraulic bore 42. The control piston 22 can be sealed off by a circumferential seal 24 or by fitting tightly into a ring-shaped sealing gap.

Figure 4:
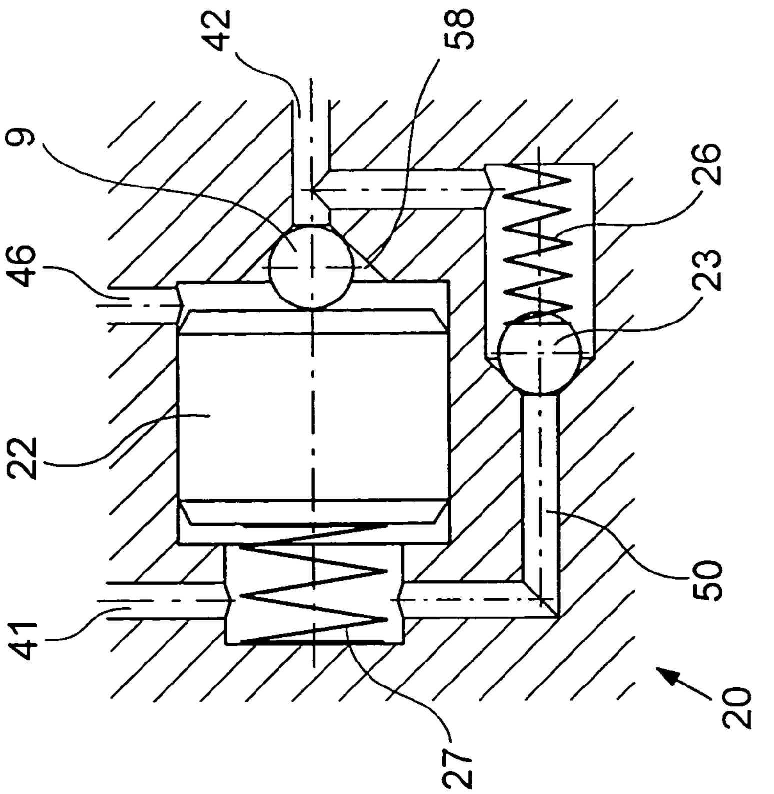

FIG. 4 shows a second alternative embodiment of the hold-open valve 20. The connections 41, 42 are the same as those explained in conjunction with FIG. 3. The difference with respect to the embodiment according to FIG. 3 is that the nonreturn valve 23 with the spring element 26 is integrated not into the control piston 22 but rather into a bypass 50, which connects the connection of the hydraulic line 42 leading to the piston space 1 to the hydraulic line 41 leading to the pump 6. There is no through-hole inside the control piston 22. In the alternative embodiment according to FIG. 4, furthermore, the closing function of the 2/2-way directional control valve is realized by a separate closing body 9 in the form of a ball. This offers the advantage that the closing body 9 centers itself inside a conical recess 58 and positional tolerances between the control piston 22 and the valve seat are therefore compensated. The control piston 22 is also pretensioned by the spring element 27 toward the closing body 9.

Figure 5:
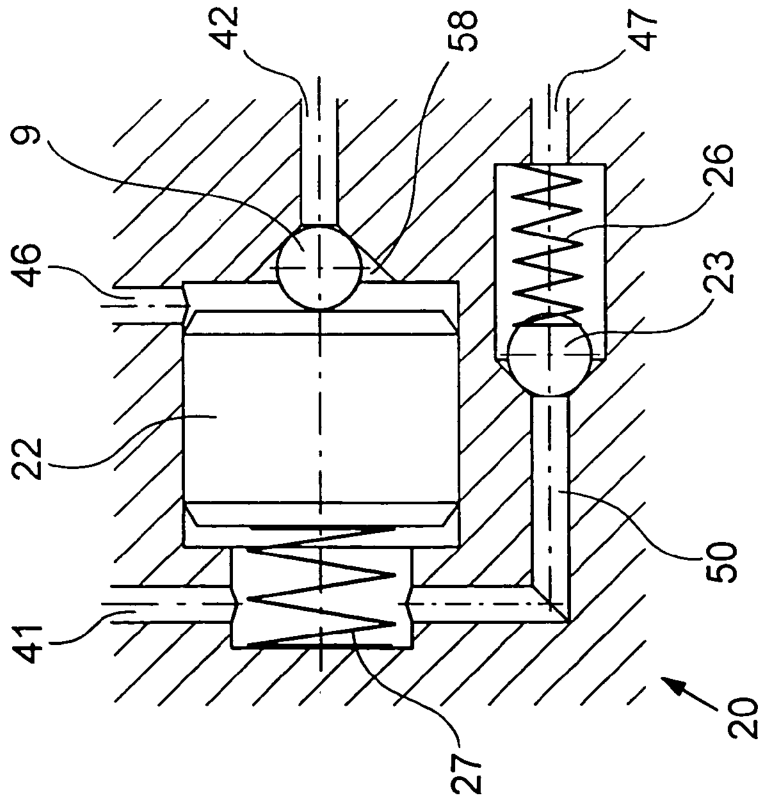

FIG. 5 shows a third alternative embodiment of the hold-open valve 20. In contrast to the embodiments according to FIGS. 3 and 4, the inflow to the piston space 1 proceeds through the hydraulic line 42 and the bypass 50, whereas the return flow of hydraulic fluid proceeds separately through the hydraulic line 47.

Figure 6:
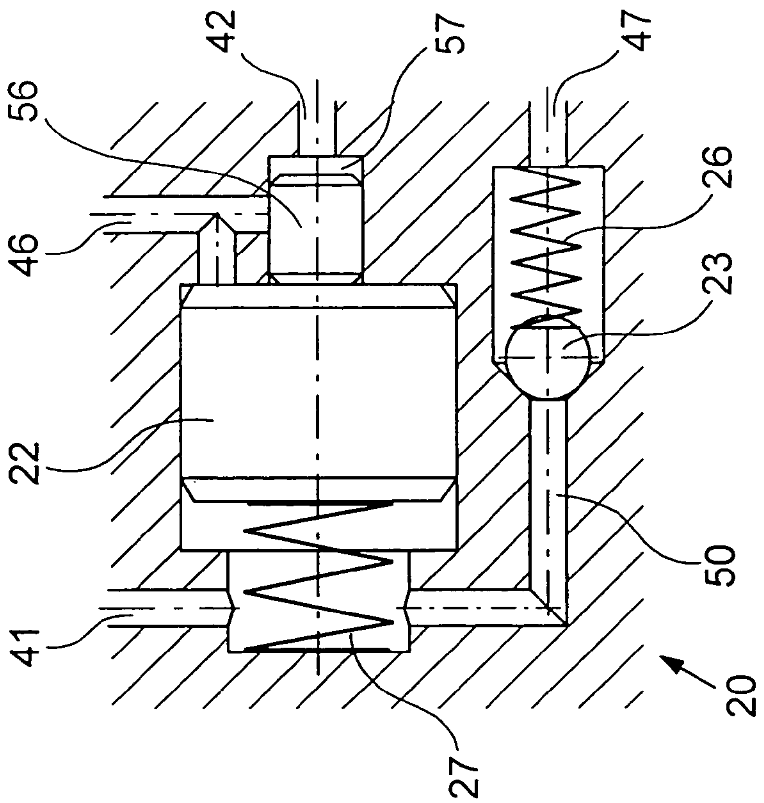

FIG. 6 shows a fourth alternative embodiment of the hold-open valve 20. In contrast to the previously described embodiments, the 2/2-way directional control valve is designed as a slide valve. The sliding body of the 2/2-way directional control valve is formed by a cylindrical body, which, depending on the position to which it is shifted, either closes or opens the hydraulic line 46. The hydraulic line 46 ends again at the space holding the control piston 22 and simultaneously at a space 57 upstream of the hydraulic line 42, in which space a piston 56 is installed. The piston 51 is free-floating and has a diameter which is much smaller than that of the control piston 22.

Figure 7:
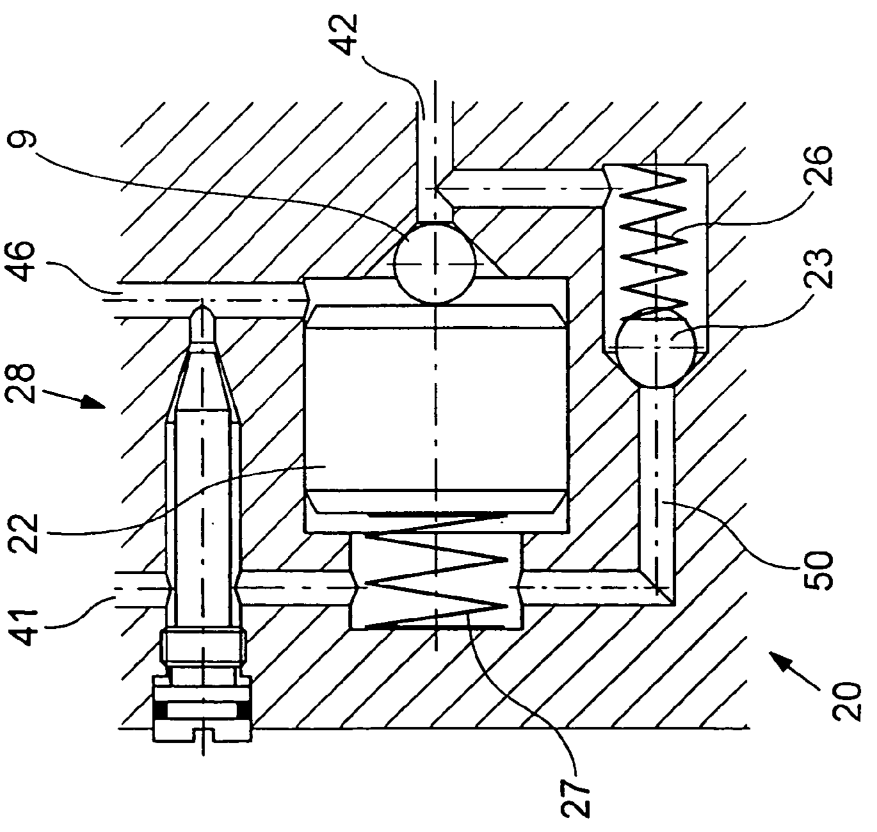

FIG. 7 shows a fifth alternative embodiment of the hold-open valve 20, in which an adjustable valve 28 is also installed between the hydraulic lines 41 and 46 so that the pressure is equalized more quickly at the control piston 22 when the drive is shut off. This has the effect of increasing the switching speed of the 2/2-way directional control valve 21. At the same time, the additional valve 28 can be adjusted in such a way as to limit to an acceptable degree the additional leakage which occurs during operation as a result of the presence of the valve.

Figure 8:
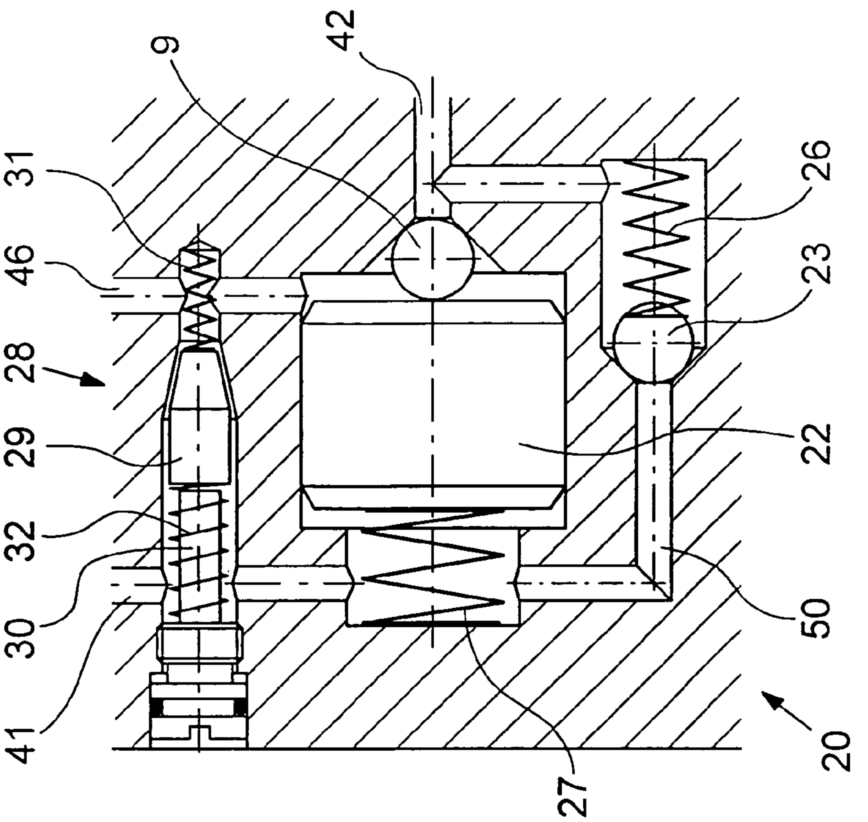

FIG. 8 shows a sixth alternative embodiment of the hold-open valve 20, in which, in contrast to the embodiment according to FIG. 7, the valve 28 is designed so that, as the pressure in the hydraulic line 41 increases, the additional leakage occurring at valve 28 is reduced or, when the operating pressure is reached, can be completely eliminated. For this purpose, a throttle body 29 of the throttle valve 28 is supported on a spring 31, so that, when the pressure in the hydraulic line 41 increases, the gap between the valve seat and the throttle body 29 is reduced or even completely closed. In this way, the switching time of the 2/2-way directional control valve can be made very short without the need to tolerate additional leakage. The throttle body 29 is in working connection with an adjusting pin 30, which is equipped with a spring 32.

The function of the inventive servo drive according to the invention is now described in the following with respect to the opening, holding-open, and closing operations of the door.

When the door is opened, the pump 6 generates a flow of hydraulic fluid, which is conveyed into the piston space 1. The pump 6 must therefore generate a pressure corresponding to the inertial weight of the door and the force of the spring 3 acting on the piston 2. This elevated pressure acts by way of the control piston 22 to close the 2/2-way directional control valve, which prevents the delivered volume of fluid from escaping into the tank space 8.

To keep the door open, the pump pressure is lowered. The pressure in the piston space 1 is maintained by the nonreturn valve 23 of the hydraulically controlled hold-open valve 20; the fluid is prevented from returning to the pump 6. The 2/2-way directional control valve is thus kept closed by a small control pressure from the pump 6.

So that the door can be closed, the unit consisting of the pump 6 and the motor 7 is turned off completely. This also occurs of necessity, of course, during a power failure. As a result of leakage in the pump 6 or at the control piston 22 or at the additional valve 28, the pressure decreases until it falls below a limit value at which the 2/2-way directional control valve opens. The hydraulic fluid can now escape through the throttle valves 17 into the tank space 8.

FIGS. 1 and 2 explain and illustrate the design of the motor control system in greater detail. As a result of this design, it is possible to integrate the following additional functions into the servo door drive according to the invention:

- the function by which the door can be opened by the user without the need to exert a significant amount of force;
- the function by which the door can be closed by exerting a sufficient amount of torque;

the function by which the door is held open and/or its closing delayed; and the function by which the movement of the door is damped as it reaches its end position.

So that the door can be opened without the need to exert a significant amount of force, the pressure in the pump-side piston space 1 must be controlled in such a way that, regardless of the position which the piston 2 is occupying, the force of the spring 3 acting on the piston 2 from the other side is almost completely cancelled out. The pump pressure, however, may never be greater than the static pressure exerted by the spring 3, because otherwise the door would open by itself. In addition, it must be possible, within reasonable technical limits, to adapt the volume flow rate being supplied to the piston space 1 by the pump 6 via the hydraulic lines 41 and 42 to any occurring opening speed.

To realize this, either a hydraulic relief valve or a pressure-control valve can be provided, or the motor torque or the motor current can be used to control the drive torque of the pump. For this purpose the motor 7 is connected to a motor amplifier 51, which works preferably according to the PWM principle. The motor amplifier 51 is connected to an controller and current regulator 52, in which a D/A converter 54 is also provided. Both the motor amplifier 51 and the controller and current regulator 52 are connected to a voltage supply 55. A position sensor 53, which cooperates with the pinion 5 and which determines the position of the pinion 5 of the piston 2, is also connected to the controller and current regulator 52.

FIG. 2 shows another embodiment of the inventive servo door drive. This differs from that shown in FIG. 1 by a different layout of the lines and a different arrangement of the valves. As can be clearly seen especially at the upper left of FIG. 2, a separation has been realized between the feed of the hydraulic fluid to the piston space 1 and its return through the hydraulic lines 41, 42, and 47. In addition, the design according to FIG. 2 does not provide a hydraulic damping function for the opening or the closing of the door with two pressure ranges.

Figure 9:
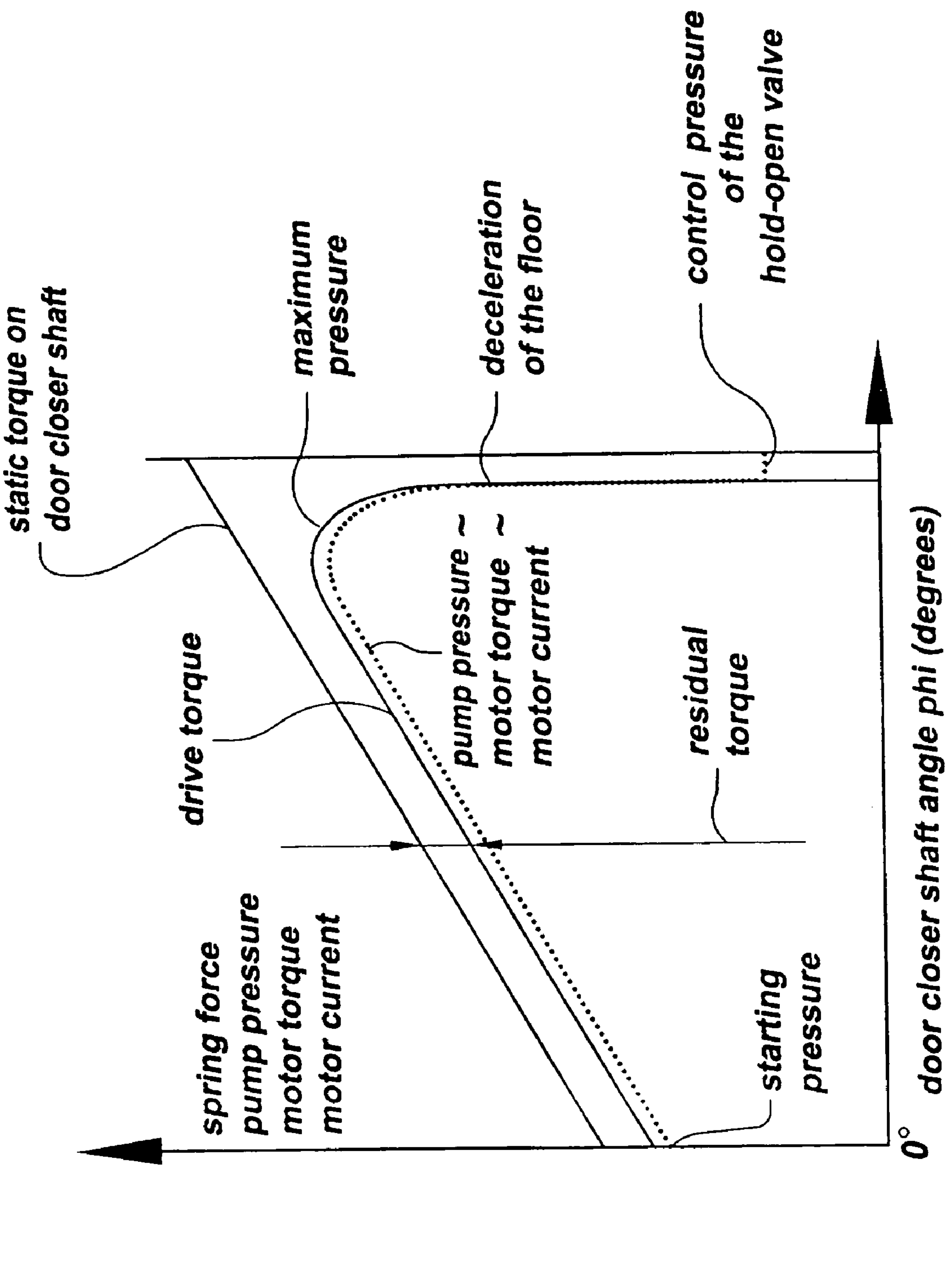

FIG. 9 shows the door drive shaft angle (phi) as a function of the elastic force, of the pump pressure, of the motor torque, and of the motor current. It can be seen that the user is required to exert only a small amount of force to open the door.

This small force is the residual torque between the drive torque and the static torque on the door closing shaft. In addition, it is obvious that the pump pressure is approximately the same as the motor torque and thus approximately the same as the motor current and is under the drive torque.

Figure 10:
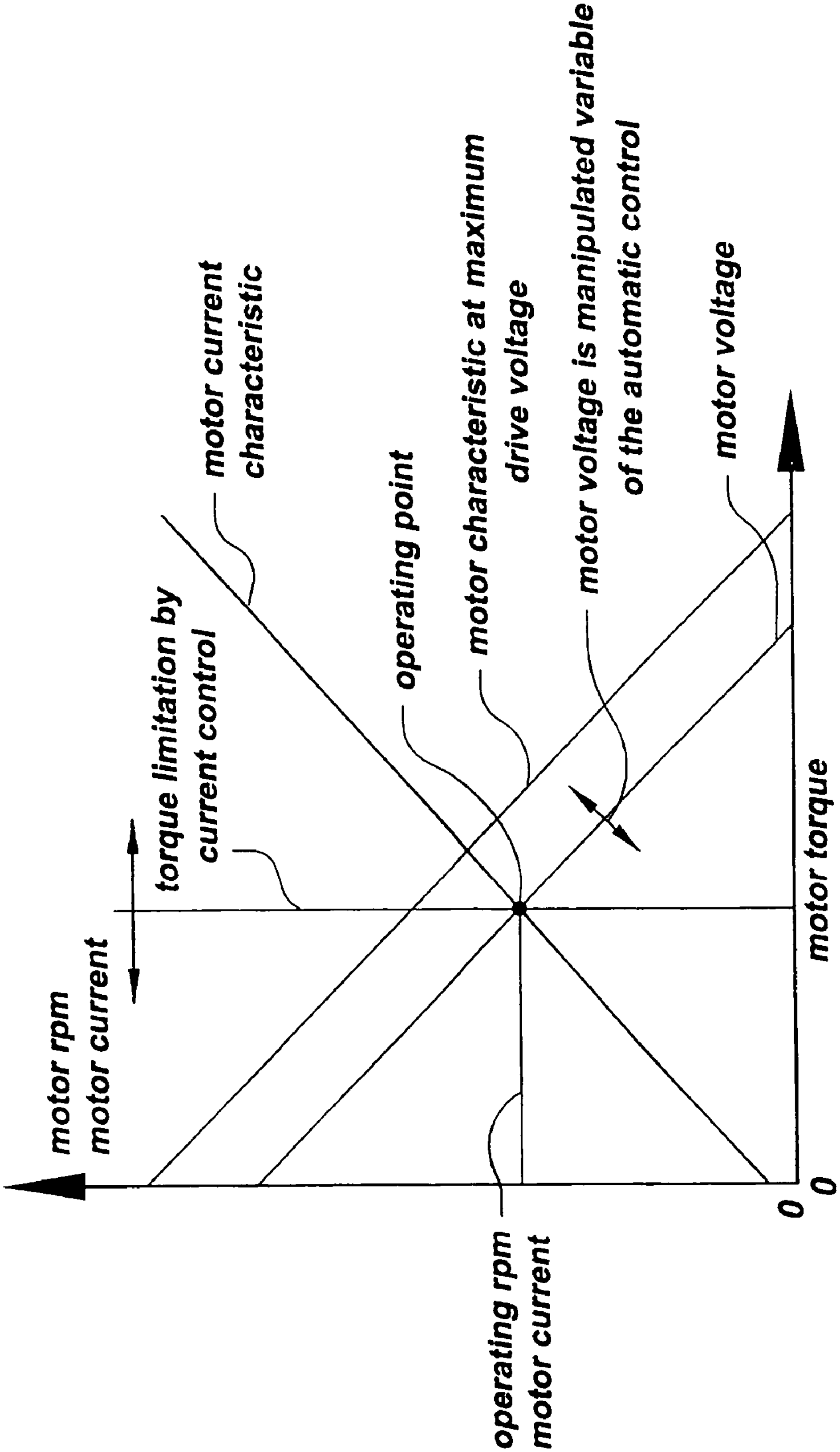

FIG. 10 shows the motor torque as a function of the motor rpm's and the motor current.

The motor voltage is the manipulated variable for the automatic control of the motor speed. At the same time, the torque is limited by the automatic control of the motor current. As a result of the torque limitation, the operating speed remains below the characteristic motor curve at maximum driving voltage.

What is claimed is:

1. A door operator, comprising:

a door operating element;

a piston coupled to the door operating element and movable in a cylinder so as to define first and second cylinder chambers formed at respective opposite piston ends;

a spring mounted in the second cylinder chamber and biasing the piston towards the first cylinder chamber so as to have the door operating element hold a door closed;

an electrohydraulic servo drive comprising a hydraulically controlled hold-open valve configured with a 2/2-way directional lockable non-return control valve operable for displacing the piston towards the second cylinder chamber so as to have the door operating element hold the door open.

2. The door operator of claim 1, wherein the 2/2-way directional lockable control valve is a slide valve.

3. The door operator of claim 1, wherein the hold-open valve further comprises a control piston and a non-return valve.

4. The door operator of claim 3, wherein at least one of said control piston and said non-return valve is spring loaded.

5. The door operator of claim 1, wherein the piston is subjected to a hydraulic pressure which is greater than a control pressure in the hold-open valve.

6. The door operator of claim 3, wherein the 2/2-way directional lockable control valve has a sealing surface, the control piston having an effective piston surface which is larger than the sealing surface of the 2/2-way directional lockable control valve.

7. The door operator of claim 1, wherein the hydraulic drive comprises a pump driven by a motor, wherein the motor is one of a DC motor, an electronically commutated motor, a speed-controlled AC motor, and a speed-controlled 3-phase motor.

8. The door operator of claim 1, wherein the hydraulic drive comprises means for separating forward flow and return flow.

9. The door operator of claim 3, wherein the non-return valve is integrated into the control piston.

10. The door operator of claim 3, wherein the non-return valve is provided in a bypass around the 2/2-way directional lockable control valve.

11. The door operator of claim 1, wherein the hydraulic drive comprises at least one throttle valve in flow communication with the first cylinder chamber and the 2/2-way directional lockable control valve for controlling closing movement of the piston towards the first cylinder chamber.

12. The door operator of claim 7, wherein the pump produces hydraulic pressure for controlling the 2/2-way directional lockable control valve.

13. The door operator of claim 3, further comprising an adjustable valve bridging hydraulic lines connecting the 2/2-way directional lockable control valve to the first chamber and to the pump, respectively, for adjusting the leakage flow at the control piston so that the switching speed of the 2/2-way directional lockable control valve can be controlled.

14. The door operator of claim 13, wherein the adjustable valve comprises a closing body acting on a spring so that the adjustable valve closes as a function of hydraulic pressure and reduces leakage flow during opening of the door.

15. The door operator of claim 13, further comprising a hydraulic line leading from a pump and a hydraulic line leading to a tank space, the adjustable valve being provided between the hydraulic lines.

16. The door operator of claim 1, further comprising an auxiliary device for performing a support function during actuation of the door operating element, the auxiliary device comprising a motor amplifier connected to the motor.

17. The door operator of claim 16, wherein the motor amplifier controls the motor speed by pulse width modulation.

18. The door operator of claim 16, further comprising a controller/current regulator for the motor amplifier.

19. The door operator of claim 18, further comprising a voltage supply connected to the controller/current regulator and the motor amplifier.

20. The door operator of claim 16, wherein the door operating element comprises a pinion driven by the piston to operate the door, and a position sensor which cooperates with the pinion, wherein the controller/current regulator is connected to the position sensor.

21. The door operator of claim 18, wherein the controller/current regulator comprises a D/A converter.

* * * * *